United States Patent
Yasukawa et al.

(10) Patent No.: US 11,419,112 B2
(45) Date of Patent: Aug. 16, 2022

(54) USER DEVICE

(71) Applicant: NTT DOCOMO, INC., Tokyo (JP)

(72) Inventors: Shinpei Yasukawa, Tokyo (JP); Satoshi Nagata, Tokyo (JP); Huan Wang, Beijing (CN); Xiaolin Hou, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/647,407

(22) PCT Filed: Sep. 19, 2017

(86) PCT No.: PCT/JP2017/033774
§ 371 (c)(1),
(2) Date: Mar. 13, 2020

(87) PCT Pub. No.: WO2019/058436
PCT Pub. Date: Mar. 28, 2019

(65) Prior Publication Data
US 2020/0260440 A1    Aug. 13, 2020

(51) Int. Cl.
*H04W 56/00*    (2009.01)
*H04W 72/04*    (2009.01)
(Continued)

(52) U.S. Cl.
CPC ...... *H04W 72/0446* (2013.01); *H04B 7/0617* (2013.01); *H04L 1/08* (2013.01); *H04W 4/46* (2018.02); *H04W 74/0825* (2013.01)

(58) Field of Classification Search
CPC .............. H04W 72/0446; H04W 4/46; H04W 74/0825; H04B 7/0617; H04L 1/08
(Continued)

(56) References Cited

U.S. PATENT DOCUMENTS

2015/0326492 A1*    11/2015   Jeong ............... H04L 47/72
                                                   370/329
2016/0278120 A1*    9/2016   Ro ................. H04W 72/0406
(Continued)

FOREIGN PATENT DOCUMENTS

JP    2017-076958 A    4/2017

OTHER PUBLICATIONS

International Search Report issued in PCT/JP2017/033774 dated Dec. 12, 2017 (5 pages).
Written Opinion of the International Searching Authority issued in PCT/JP2017/033774 dated Dec. 12, 2017 (3 pages).
(Continued)

*Primary Examiner* — Sai Ming Chan
(74) *Attorney, Agent, or Firm* — Osha Bergman Watanabe & Burton LLP

(57) ABSTRACT

A user device performing communication with another user device by beamforming in a first frequency and a second frequency different from the first frequency is provided. The user device includes a receiving unit configured to receive a first sensing signal in the first frequency; a control unit configured to select a resource in the second frequency used for transmission, based on a resource location on a radio frame in which the first sensing signal is provided, or based on information, contained in the first sensing signal, indicating a resource location on a radio frame in the second frequency; and a transmitting unit configured to perform data transmission in the second frequency by using the selected resource.

6 Claims, 14 Drawing Sheets

(51) Int. Cl.
   *H04W 4/46*    (2018.01)
   *H04B 7/06*    (2006.01)
   *H04L 1/08*    (2006.01)
   *H04W 74/08*   (2009.01)

(58) Field of Classification Search
   USPC .......................................................... 370/329
   See application file for complete search history.

(56) References Cited

U.S. PATENT DOCUMENTS

2017/0373741 A1\* 12/2017 Yang .................... H04L 1/18
2019/0090218 A1\*  3/2019 Noh .................... H04L 27/0006

OTHER PUBLICATIONS

Huawei, HiSilicon; "Discussion on efficient discovery"; 3GPP TSG RAN WG1 Meeting #89, R1-1707038; Hangzhou, China; May 15-19, 2017 (3 pages).
Intel Corporation; "Considerations on eV2XNR design"; 3GPP TSG RAN WG1 Meeting #86bis, R1-1610367; Lisbon, Portugal; Oct. 10-14, 2016 (8 pages).
3GPP TS 36.213 V14.3.0; "3rd Generation Partnership Project; Technical Specification Group Radio Access Network; Evolved Universal Terrestrial Radio Access (E-UTRA); Physical layer procedures (Release 14)" Jun. 2017 (460 pages).
3GPP TS 36.211 V14.3.0; "3rd Generation Partnership Project; Technical Specification Group Radio Access Network; Evolved Universal Terrestrial Radio Access (E-UTRA); Physical channels and modulation (Release 14)"; Jun. 2017 (195 pages).

\* cited by examiner

FIG.2
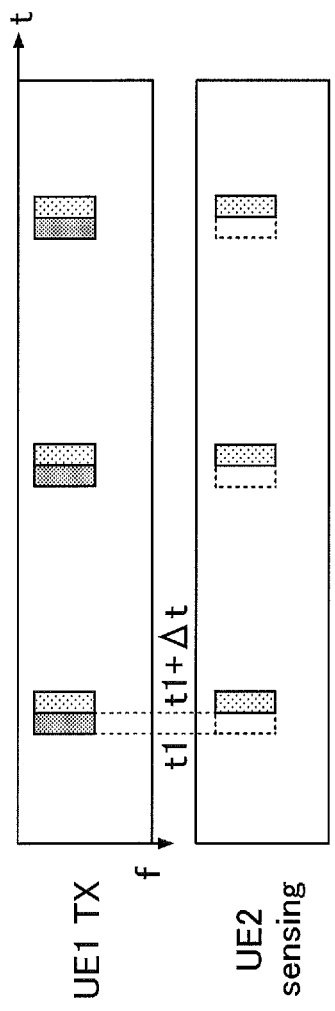
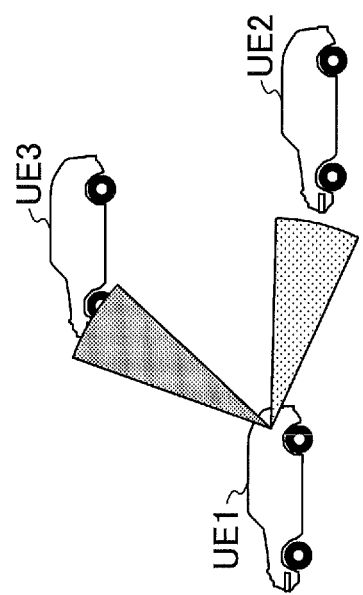

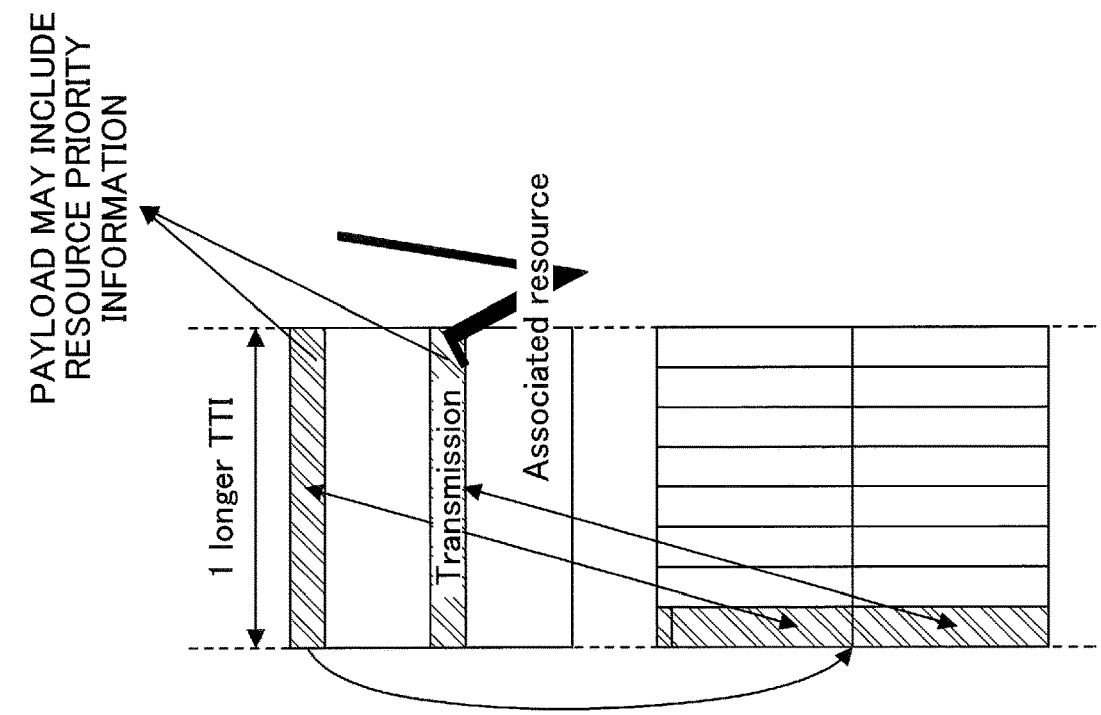
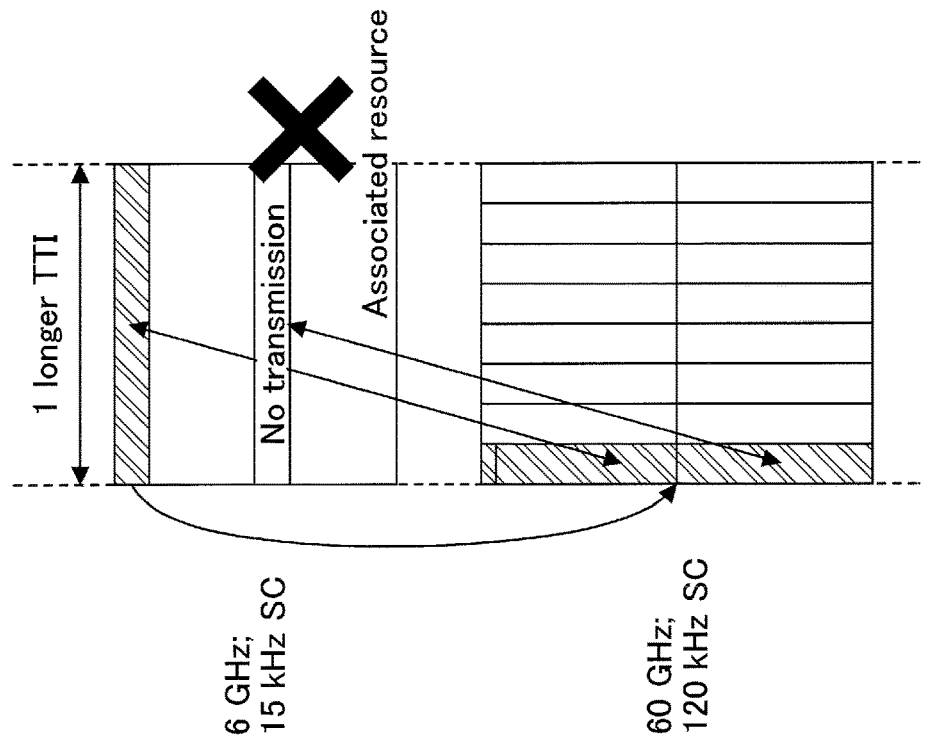
FIG.10

USER DEVICE

TECHNICAL FIELD

This invention relates to a user device in a wireless communication system.

BACKGROUND ART

In LTE (Long Term Evolution), a successor of LTE (such as LTE-A (LTE Advanced) and NR (New Radio, also referred to as "5G")), D2D (Device to Device) technology, which is a technology for direct data communication between user devices without involving a wireless base station, has been discussed.

D2D reduces traffic between a user device and a base station, and enables communication between user devices even when a base station becomes disabled because of disaster or the like.

Functions supported in D2D are classified into D2D discovery which is a function to discover other communicable user devices, and D2D communication which is a function to enable direct communication between user devices (also referred to as "direct communication between terminals" or the like). In the following, when D2D discovery and D2D communication are not required to be distinguished from each other, D2D discovery and D2D communication are simply referred to as "D2D". In addition, a signal in compliance with a D2D standard is referred to as a "D2D signal".

Although, in 3GPP (3rd Generation Partnership Project), D2D is referred to as "sidelink", the term "D2D" will be used in the present specification since "D2D" is a more general term. However, in the embodiments to be described below, the term "sidelink" may be used as necessary.

Also in 3GPP, supporting V2X (Vehicle to Everything) function has been discussed by enhancing the above D2D function, and development of specifications of V2X is in progress. V2X is a part of ITS (Intelligent Transport Systems), and is a general term for V2V (Vehicle to Vehicle) representing communication configuration performed between cars as illustrated in FIG. 1B, V2I (Vehicle to Infrastructure) representing a communication configuration between a car and RSU (Road-Side Unit) provided beside a road, V2N (Vehicle to Nomadic device) representing communication a configuration between a car and a mobile terminal of a driver, and V2P (Vehicle to Pedestrian) representing a communication configuration between a car and a mobile terminal of a pedestrian.

In LTE Release 14 (hereinafter may be referred to as "Rel-14"), specifications of some functions of V2X have been developed (see Non-Patent Document 1 for example). In the specifications, with respect to V2X communication resource allocation to a user device, Mode and Mode 4 are defined. In Mode 3, a resource for transmission is dynamically allocated using DCI (Downlink Control Information) sent from a base station to the user device. Further in Mode 3, SPS (Semi Persistent Scheduling) can be used. In Mode 4, a user device autonomously acquires a resource for transmission.

Also, D2D in NR is supposed to use wide ranges of frequencies, from a low frequency band similar to LTE, to a high frequency band higher than LTE (millimeter wave band). Especially, as path loss increases in the high frequency band, using beamforming technology having a narrow beam width has been discussed, in order to compensate for the path loss (see Non-Patent Document 2 for example).

PRIOR-ART DOCUMENTS

Non-Patent Documents

[Non-Patent Document 1] 3GPP TS 36.213 V14.3.0 (2017-06)
[Non-Patent Document 2] 3GPP TS 36.311 V14.3.0 (2017-06)

SUMMARY OF INVENTION

Problem to be Solved by the Invention

In D2D, if a user device for data transmission employs the beamforming, in user devices that are located in directions other than a direction to which a beam is directed, power of the received beam decreases and detection of the beam becomes difficult. Also, a beam in the high frequency band has high straightness and power loss caused by a shielding article is large. Thus, for example, in V2X, depending on a position of a vehicle, transmission of a beam is prevented by other vehicles. Thus, power of the beam received by a user device for receiving decreases and detection of the beam becomes difficult. In this way, a node (user device) not being detected by another user device (may also be referred to as a "hidden node") may occur. When another user device uses a resource that the hidden node is using, a problem of resource collision, a problem that a communication mode is restricted to half-duplex, or the like arises.

This invention is made to solve the above problem, and aims at providing a technique for enabling a user device performing signal transmission using the beamforming in D2D to appropriately select a resource to be used.

Means for Solving the Problem

According to the present disclosure, there is provision of a user device performing communication with another user device by beamforming in a first frequency and a second frequency different from the first frequency. The user device includes a receiving unit configured to receive a first sensing signal in the first frequency; a control unit configured to select a resource in the second frequency used for transmission, based on a resource location on a radio frame in which the first sensing signal is provided, or based on information, contained in the first sensing signal, indicating a resource location on a radio frame in the second frequency; and a transmitting unit configured to perform data transmission on the second frequency by using the selected resource.

Advantage of the Invention

According to the embodiment of the present invention, a technique can be provided such that a user device performing transmission using beamforming in D2D can appropriately select a resource to be used.

BRIEF DESCRIPTION OF DRAWINGS

FIG. 2 is a diagram illustrating an example of a sensing operation performed by the user device 100;

FIG. 10 is a diagram illustrating an example (3) of association between a sensing resource and a data resource in the embodiment;

DETAILED DESCRIPTION OF THE PREFERRED EMBODIMENTS

Embodiments of the present invention will be described below with reference to the drawings. Note that the embodiments that will be described below are simply an example, and embodiments to which the present invention is applied are not limited to the following embodiments.

When operating a wireless communication system according to the embodiments, conventional technologies can be used as appropriate. An example of the conventional technology is conventional LTE, but is not limited to the conventional LTE. In addition, a term "LTE" used in the present specification includes LTE-Advanced, and communication standards after LTE-Advanced (such as NR), unless otherwise stated.

Figure 1A:
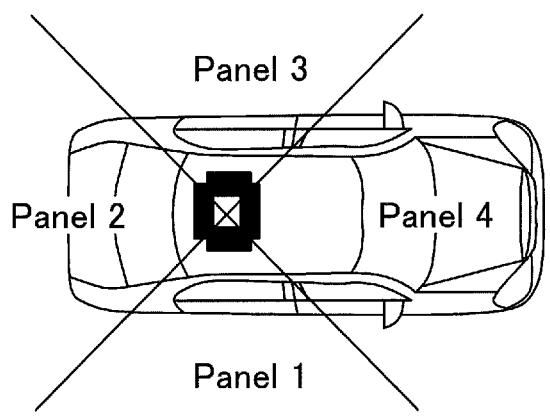
FIG. 1A is a diagram illustrating an example of a configuration of antennas installed in a user device 100.
Figure 1B:
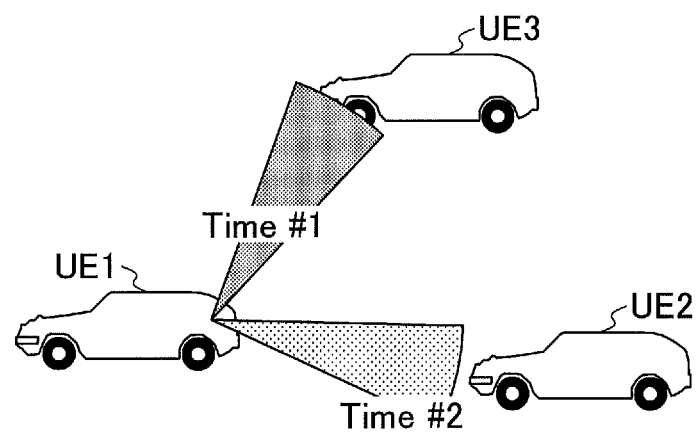
FIG. 1B is a diagram illustrating an example of transmission performed by the user device 100 using different beams in a time-sharing manner.
Figure 1C:
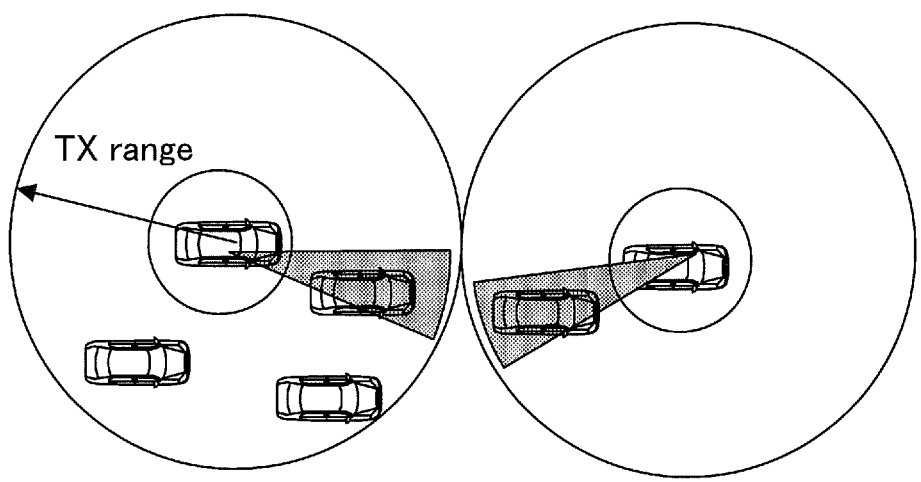
FIG. 1C is a diagram illustrating a transmission range of the user device 100.

FIGS. 1A, 1B, and 1C are diagrams illustrating an example of a configuration of the wireless communication system according to the present embodiment. As illustrated in FIG. 1B or FIG. 1C, the wireless communication system according to the present embodiment includes multiple user devices 100. Although FIG. 1B illustrates a case in which three of the user devices 100 are present, this is merely an example, and more than three of the user devices 100 may be present. In the following description, the user device 100 may also be referred to as a "UE" (User Entity). The user device 100 is a communication device equipped with a wireless communication function, such as a smartphone, a cellular phone, a tablet, a wearable terminal, or an M2M (Machine-to-Machine) communication module, and connects with a base station or another user device 100 wirelessly to use various communication services provided by the wireless communication system. The user device 100 can transmit or receive a signal using beamforming. In the present embodiment, a case is mainly assumed in which the user device 100 is a communication device installed in a vehicle in V2X environment.

In the present embodiment, as a duplex communication system, a TDD (Time Division Duplex) system, an FDD (Frequency Division Duplex) system, or other communication systems (such as Flexible Duplex) may be adopted. Further, in the following description, transmitting a signal using a transmission beam may be performed by transmitting a signal multiplied by a precoding vector (a signal precoded by a precoding vector). Similarly, receiving a signal using a reception beam may be performed by multiplying a received signal by a predetermined weight vector. Further, transmitting a signal using a transmission beam may be expressed as transmitting a signal using a specific antenna port. Similarly, receiving a signal using a reception beam may be expressed as receiving a signal using a specific antenna port. The antenna port indicates a logical antenna port defined in 3GPP standard, or a physical antenna port. However, a method of forming a transmission beam and a reception beam is not limited to the above method. For example, in a case in which the user device 100 is equipped with multiple antennas, a method for changing an angle of each antenna, a combination of the method using a precoding vector and the method for changing an angle of each antenna, a method of switching an antenna panel to be used among different antenna panels, a method for using multiple antenna panels together, or other methods may be used. Further for example, in a high frequency band, multiple different transmission beams may be used. A method of using multiple transmission beams is referred to as a multi-beam operation, and a method using a single transmission beam is referred to as a single-beam operation.

FIG. 1A is a diagram illustrating an example of a configuration of antennas installed in the user device 100. Antenna panels Panel 1, Panel 2, Panel 3, and Panel 4 are mounted on a vehicle so as to face right direction, backward direction, left direction, and forward direction respectively, and function as antennas for transmitting and receiving millimeter wave band signals.

FIG. 1B is a diagram illustrating an example of transmission performed by the user device 100 using different beams in a time-sharing manner. At time #1, a beam is transmitted to UE3, and at time #2, a beam is transmitted to UE2.

FIG. 1C is a diagram illustrating a transmission range of the user device 100. A range "TX range" in FIG. 1C represents a range of communication targeted by V2X in the present embodiment. The range of communication is assumed to be, for example, within a radius of a couple of hundred meters from a center of a vehicle.

In the present embodiment, the user device 100 is assumed to perform direct communication using a high frequency. In this case, as pass loss between user devices is large, use of the beamforming is required in order to attain a given communication distance. In addition, because of mobility between user devices, or because of multicast, required reliability may not be attained in a given communication distance. Thus, beam switching transmission for switching beams in every predetermined period may be performed, or repetitive beam transmission may be performed. An example of the high frequency includes a millimeter wave band. Further, it is assumed that periodic or quasi-periodic communication traffic occurs in the user device 100. Further, it is assumed that the user device 100 generally performs autonomous resource selection by sensing resources, as defined in 3GPP release 14, and that the user device 100 can perform background sensing and can perform allocation of transmission resources in a background.

The user device 100 performs data transmission using the beamforming in the millimeter wave band, by considering a gain factor and a loss factor. Multiple panel antennas each being direct to different directions, illustrated in FIG. 1A, are used for transmitting and/or receiving millimeter waves. Note that, for example, different wireless communication parameters (numerology) are used in a low frequency band (may also be referred to as an "LF band") less than 6 GHz and in the millimeter wave band (may also be referred to as an "HF band" in the following description).

FIG. 2 is a diagram illustrating an example of a sensing operation performed by the user device 100. The user device 100 transmits narrow beams each using different resources to adjacent user devices 100. Each of the adjacent user devices 100 can only detect a beam directed to itself, and cannot detect beams directed to the other user devices 100. Accordingly, a problem of hidden nodes caused by beamforming arises.

As illustrated in FIG. 2, UE1 performs transmission of a beam directed to UE3 at time t1, and performs transmission of a beam directed to UE2 at time t1+Δt. In this case, as the beam transmitted from UE1 at time t1 is directed to UE3, UE2 cannot detect that UE1 is performing transmission at time t1. As illustrated in a row of "UE2 sensing" in FIG. 2, UE2 determines that a resource is unused at time t1. However, in reality, as the resource is being used by UE1, if UE2 selects the resource, a resource collision occurs.

Figure 3A:
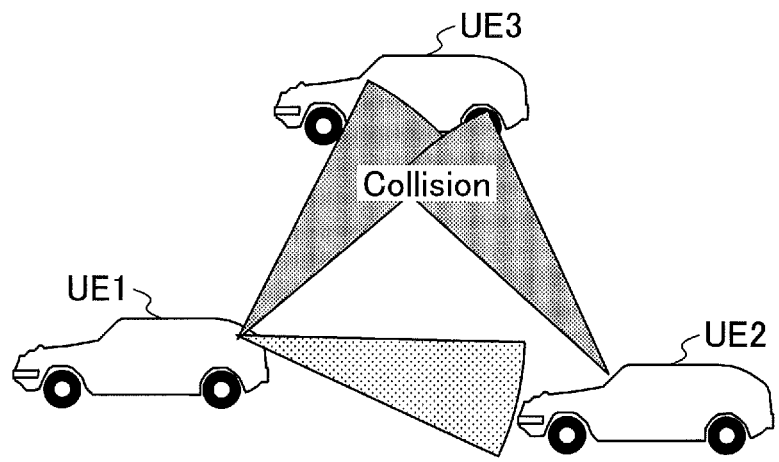
FIG. 3A is a diagram illustrating an example of resource collision that occurs when the user device 100 performs transmission.

FIG. 3A is a diagram illustrating an example of resource collision that occurs when the user device 100 performs transmission. A resource collision may occur because of a hidden node caused by beamforming.

As illustrated in FIG. 3A, when UE1 is transmitting a beam directed to UE3, UE2 cannot detect the beam. Thus, there is a possibility of UE2 selecting the same resource as that used in the UE1-to-UE3 beam, for transmitting a beam to UE3. When the same resource is selected, a resource collision occurs. That is, a phenomenon that UE1 becomes a hidden node with respect to UE2 occurs, as UE2 cannot detect transmission performed by UE1 because of beamforming.

Figure 3B:
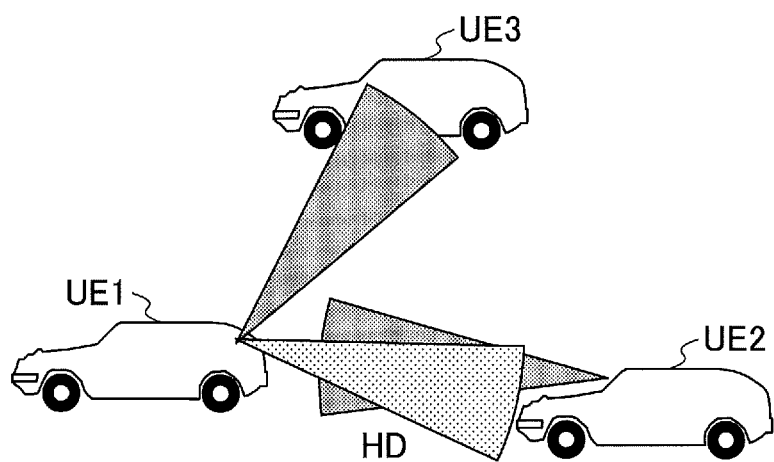
FIG. 3B is a diagram illustrating a case in which an HD problem occurs when the user device 100 performs transmission.

FIG. 3B is a diagram illustrating a case in which an HD (Half-Duplex) problem occurs when the user device 100 performs transmission. As illustrated in FIG. 3B, when UE1 is transmitting a beam directed to UE3, UE2 cannot detect the beam. Thus, there is a possibility of UE2 selecting the same resource as that used in the UE1-to-UE3 beam, for transmitting a beam to UE1. When the same resource is selected, a resource collision occurs, and communication between UE1 and UE2 becomes HD (Half-Duplex). That is, a phenomenon that UE1 becomes a hidden node occurs, as UE2 cannot detect transmission performed by UE1 because of beamforming.

Figure 4:
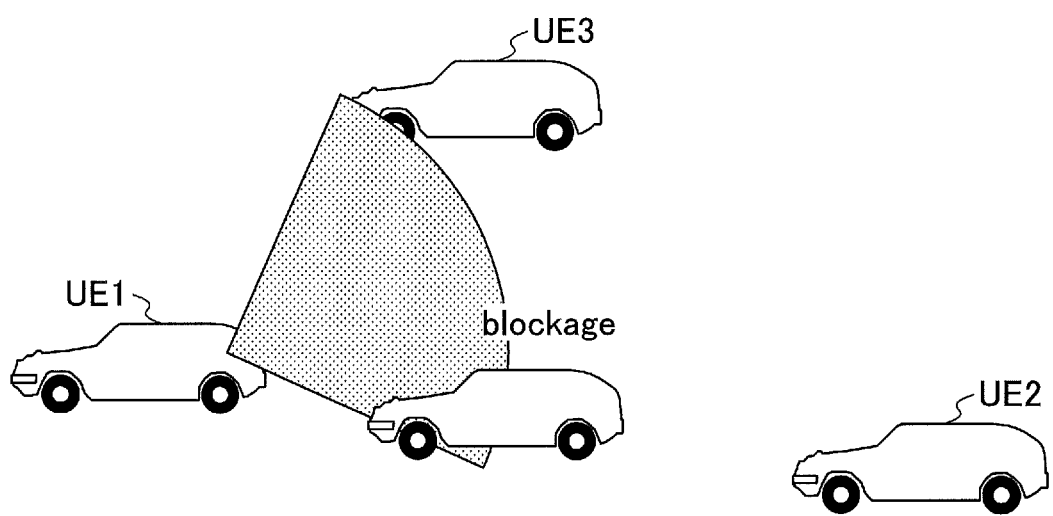
FIG. 4 is a diagram illustrating a case in which beam transmission is blocked when the user device 100 performs transmission.

FIG. 4 is a diagram illustrating a case in which beam transmission is blocked when the user device 100 performs transmission. As a millimeter wave has high straightness, beam transmission may be blocked by an obstacle. Occurrence of blockage makes accurate sensing of a millimeter wave difficult.

As illustrated in FIG. 4, as UE2 cannot receive a beam transmitted from UE1 because of an obstacle, UE2 cannot detect the transmission from UE1 correctly. Thus, when UE2 selects a resource, a resource collision may occur.

Embodiment

Next, one or more embodiments will be described.

Figure 5:
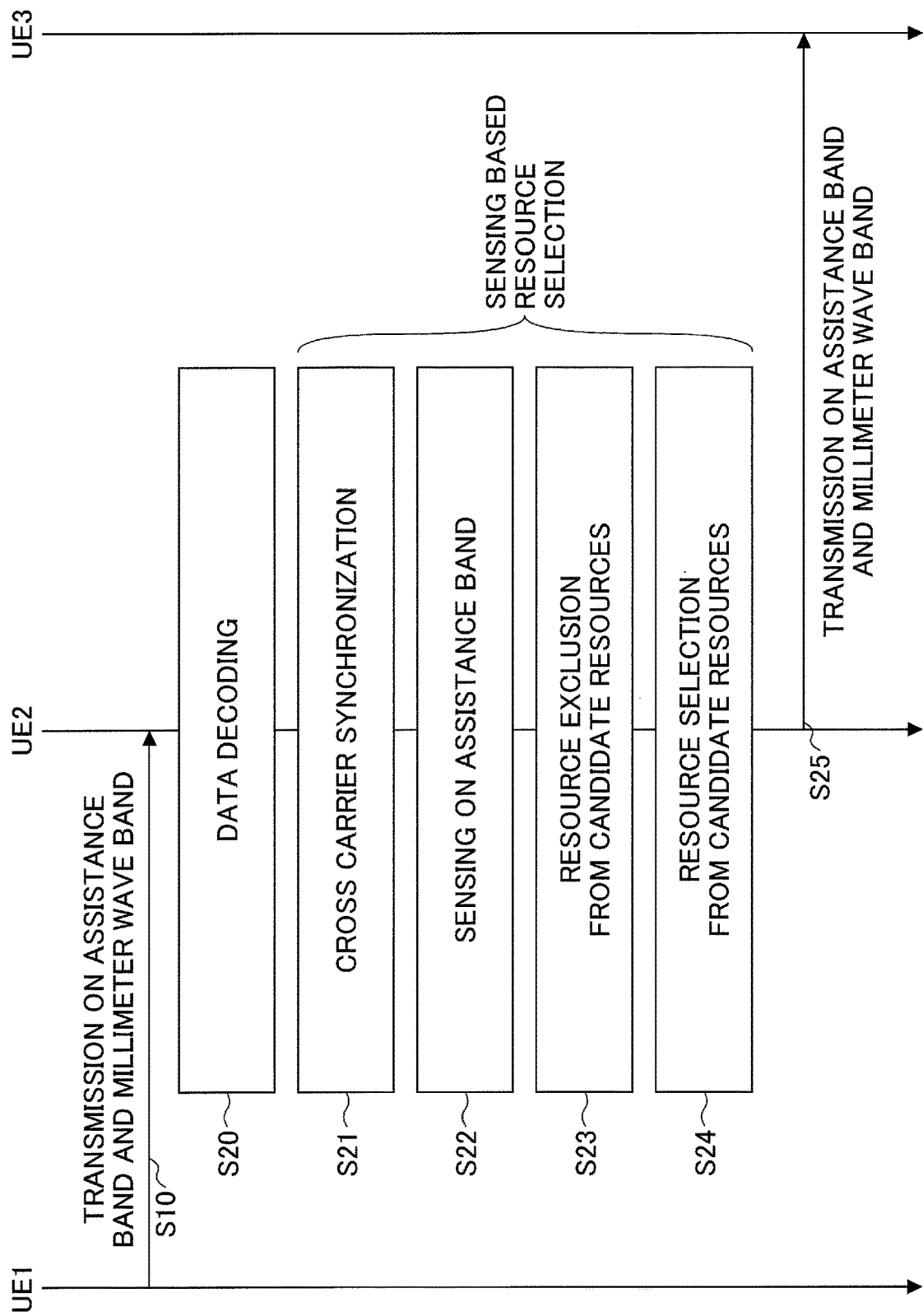
FIG. 5 is a diagram illustrating an example of a communication procedure performed by the user device 100.

FIG. 5 is a diagram illustrating an example of a communication procedure performed by the user device 100. One way to counteract the above mentioned hidden node problem caused by beamforming is to support data communication on the millimeter wave band, by using the LF band as an assistance band. That is, by performing notification of resource allocation, measurement of RSRP (Reference Signal Received Power), and measurement of RSSI (Received Signal Strength Indicator) on the assistance band which is the LF band, communication on the millimeter wave band is supported.

A resource pool in the assistance band that is used for sensing, and a resource pool in the millimeter wave band that is used for data communication are configured or preconfigured. Fixed correlation between a resource used for sensing and a resource used for data communication is configured or preconfigured. Transmission parameters for the resource pool in the assistance band that is used for sensing, and transmission parameters for the resource pool in the millimeter wave band that is used for data communication are configured or preconfigured, in accordance with UE capability of the user device 100. The user device 100 can simultaneously perform omni-directional transmission using the resource pool for sensing, and beamforming transmission using the resource pool for data transmission. The resource pool for sensing is provided in the assistance band of the LF band, and a sensing signal is transmitted by the omni-directional transmission; thus, it can be received in a wider area than a signal transmitted on the millimeter wave band. Thus, even a user device 100 that cannot receive a beam in the millimeter wave band is expected to be able to receive the sensing signal.

A combination of a carrier used for assistance and a carrier used for data communication may be preconfigured, or may be reported from a base station using an upper layer signaling. Multiple carriers for data communication may be associated with an assistance carrier. In this case, because dependency related to available resource identification occurs among data communication carriers, for each resource pool in the assistance carrier, a corresponding data communication carrier may be associated.

A user device 100 at close distance serving as a receiver performs cross carrier synchronization using the assistance band and the millimeter wave band. The user device 100 selects a resource in the millimeter wave that is to be used for data communication, based on the sensing on the assistance band. Measurement of RSRP and RSSI (or one of RSRP and RSSI) in the assistance band in which sensing is to be performed is configured or preconfigured. If a result of measurement of RSRP and RSSI (or one of RSRP and RSSI) exceeds a predetermined threshold, a resource for data associated with the resource used for the measurement is excluded from candidate resources. Among the candidate resources not being excluded, the user device 100 selects a resource used for data communication. When a resource used for data communication (or a resource used for sensing) is selected, a corresponding resource used for sensing (or used for data communication) is determined.

A sequence of a process in FIG. 5, in which UE1 performs transmission to UE2, UE2 performs resource selection by performing sensing, and UE2 performs transmission to UE3, will be described.

At step S10, UE1 transmits to UE2 a sensing signal on the assistance band and a data signal on the millimeter wave band. At step S20, UE2 decodes data. However, in some cases, such as a case in which only a resource location of the sensing signal is required, or in which data transmission is directed to a user device 10 other than UE2, decoding of data is not necessarily performed. Next, at step S21, by performing cross carrier synchronization, UE2 performs synchronization of a signal on the assistance band and a signal on the millimeter wave band. Details of the cross carrier synchronization will be described below.

At step S22, UE2 performs sensing on the assistance band. For example, UE2 measures RSRP or RSSI in the sensing signal having been transmitted from UE1 at step S10, and acquires information about resource usage contained in the sensing signal. Subsequently, based on a result of the sensing performed at step S22, a resource is excluded among candidate resources to be used for data communication (S23). For example, if a result of measurement of RSRP or RSSI of the sensing signal having been transmitted from UE1 at step S10 exceeds a predetermined threshold, a corresponding resource may be excluded. Alternatively, if the information about resource usage contained in the sensing signal indicates exclusion of a resource, a corresponding resource may be excluded.

At step S24, UE2 selects a resource used for data communication, among the candidate resources that were not excluded at step S23. A set of operations from the cross carrier synchronization at step S21 to the resource selection at step S24 represents a sensing-based resource selection operation. Next, at step S25, UE2 transmits data to UE3 on the millimeter wave band, by using the resource selected at step S24, and transmits a sensing signal to UE3 by using a corresponding resource on the assistance band.

Figure 6:
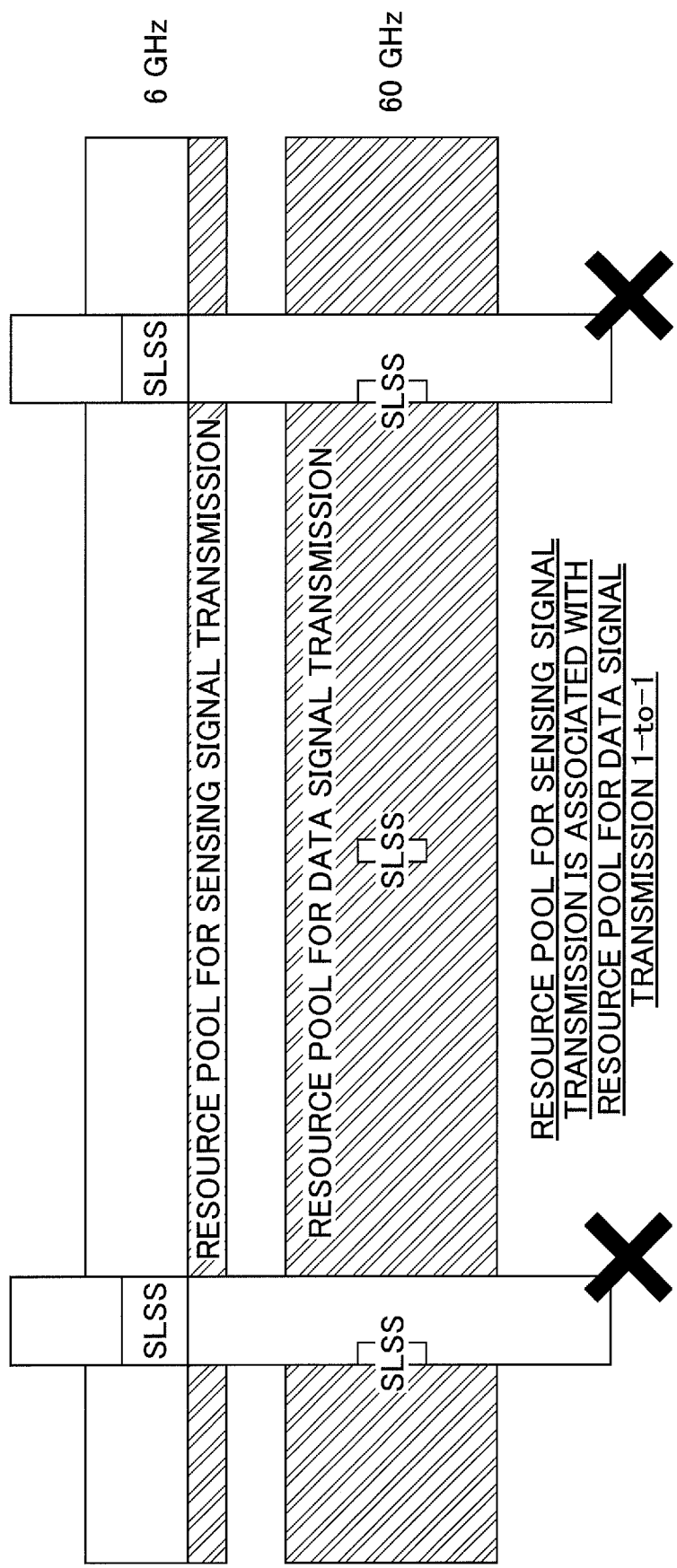
FIG. 6 is a diagram illustrating an example of a configuration of a resource pool according to an embodiment.

FIG. 6 is a diagram illustrating an example of a configuration of the resource pool according to the present embodiment. In FIG. 6, LF is a 6 GHz band, and HF is a 60 GHz band, for example. Also, a horizontal axis represents a time direction and a vertical axis represents a frequency direction. A resource pool used for sensing performed by each of the user devices 100, and a resource pool used for data communication that is correlated with the resource pool used for sensing, are configured or preconfigured. An SLSS (Sidelink Synchronization Signal) represents a synchronization signal for sidelink. A resource that is not allowed to be used for millimeter wave band transmission, such as a resource corresponding to a TTI (Transmission Time Interval) overlapping the SLSS, is excluded from a resource pool used for data communication or control information transmission. A resource used for sensing corresponding to the excluded resource is also excluded from the resource pool. Note that a resource in the resource pool used for sensing is associated with a resource in the resource pool used for data communication in 1-to-1. Details will be described below.

Figure 7:
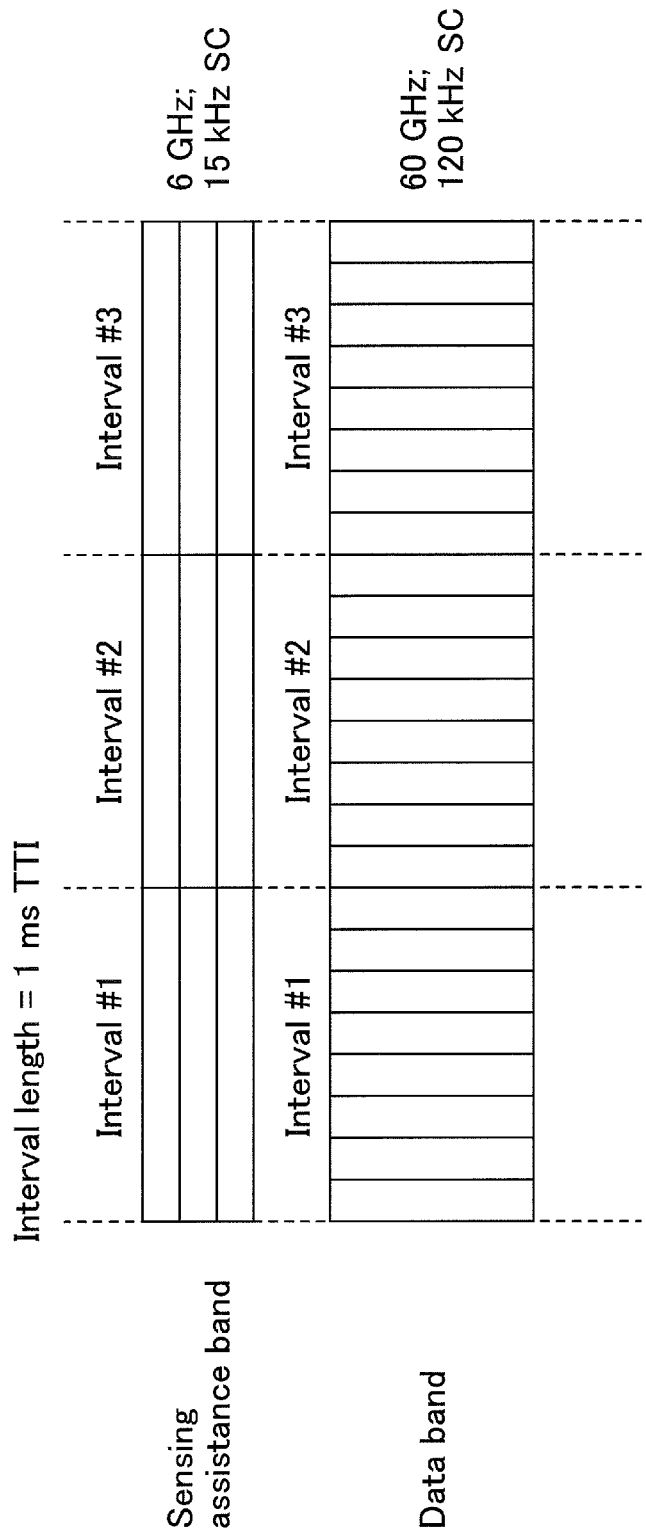
FIG. 7 is a diagram illustrating an example of a resource allocation according to the embodiment.

FIG. 7 is a diagram illustrating an example of a resource allocation according to the present embodiment. An interval regarding association between a resource used for sensing and a resource for data communication is configured or preconfigured. That is, in the assistance band for sensing and in the millimeter wave band for data communication, a length of the interval regarding the association may be the same. Further, an interval of a resource used for sensing may be associated with an interval of a resource used for data communication in a 1-to-1 association. Resource association may be performed only within a set of intervals having 1-to-1 association.

As illustrated in FIG. 7, suppose a case in which the assistance band used for sensing is a 6 GHz band, a subcarrier interval of the assistance band is 15 kHz, the millimeter wave band used for data communication is 60 GHz band, and a subcarrier interval of the millimeter wave band is 120 kHz. In FIG. 7, let a length of an interval of resource association be 1 millisecond, which is the same as a TTI. With respect to Interval #1 in the assistance band used for sensing and Interval #1 in the millimeter wave band used for data communication, resource association is performed. Similarly, with respect to Interval #2 and Interval #3 in the assistance band used for sensing and Interval #2 and Interval #3 in the millimeter wave band used for data communication, resource association is performed respectively.

A resource in the LF band used for sensing (hereinafter referred to as a "sensing resource") is associated with a resource in the HF band used for data communication (hereinafter referred to as a "data resource") in a 1-to-1 association, or the association may be preconfigured.

For example, a sensing resource in the LF band, which is a sensing resource specified for an X number of PRBs (Physical Resource Blocks) and for 1 TTI or a duration shorter than 1 TTI, may be associated with a data resource in the HF band, which is a data resource specified for one subchannel and for 1 TTI or a duration shorter than 1 TTI.

Alternatively, for example, a sensing resource in the LF band may be associated with multiple sets of data resources in the HF band. The sets of data resources correspond to data transmitted by beam switching or beam repetition.

Further, whether or not a two-stage scheduling assignment (SA) is to be sent may be configured or preconfigured. When a scheduling assignment of a first stage is received in the LF band by a user device 100 at close distance, information regarding sensing is reported and sensing is performed in the LF band. Subsequently, a scheduling assignment of a second stage may be reported, by using a part of a data resource associated with the sensing resource. The scheduling assignment of the first stage may include sensing related information, such as priority information and resource reservation information used by other beams. The scheduling assignment of the second stage may include other information such as MCS (Modulation and Coding Scheme), resource allocation information, and a set of a source ID and a destination ID (or one of a source ID and a destination ID).

Alternatively, whether or not sensing in the HF band is to be executed may be switched. The user device 100 may be configured not to perform sensing in the LF band and to determine whether or not sensing is to be executed in the HF band.

The user device 100 may explicitly report information regarding a data resource to be used in the HF band to a user device 100 at close distance, by transmitting a signal including SCI (Sidelink Control Information) or a MAC-CE (Medium Access Control-Control Element) using a sensing resource in the LF band.

Figure 8:
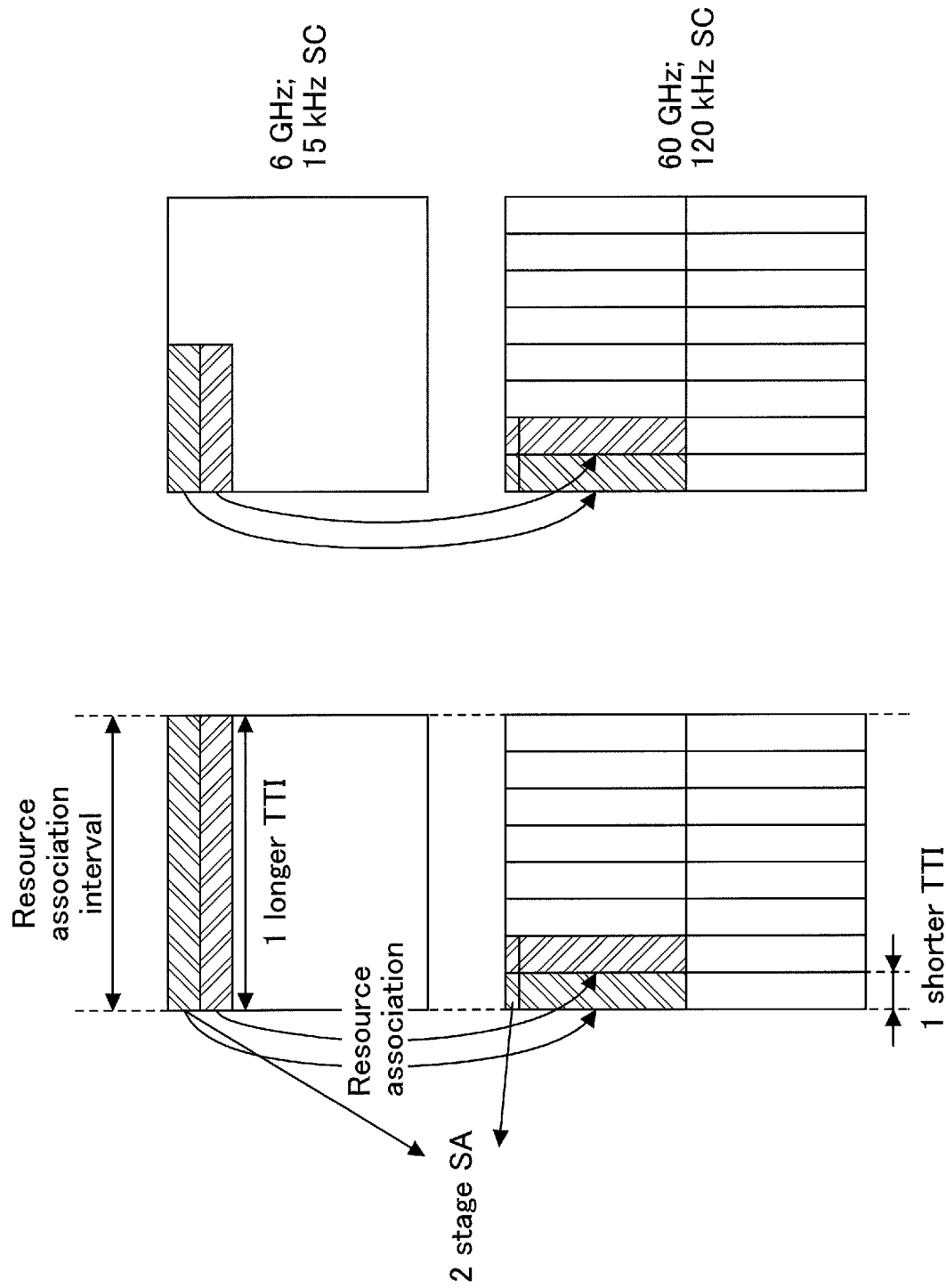
FIG. 8 is a diagram illustrating an example (1) of association between a sensing resource and a data resource in the embodiment.

FIG. 8 is a diagram illustrating an example (1) of association between a sensing resource and a data resource in the present embodiment. FIG. 8 illustrates a case in which one sensing resource is associated with one data resource. As illustrated in FIG. 8, suppose a case in which the assistance band used for sensing is a 6 GHz band, a subcarrier interval of the assistance band is 15 kHz, the millimeter wave band used for data communication is a 60 GHz band, and a subcarrier interval of the millimeter wave band is 120 kHz. The association between the sensing resource and the data resource as illustrated in FIG. 8 may be reported explicitly from the user device 100 to a user device 100 at close distance.

A left side diagram in FIG. 8 illustrates a case in which an interval of resource association is longer than 1 TTI in the assistance band and is shorter than 1 TTI in the millimeter wave band. One sensing resource in the assistance band corresponds to one data resource in the millimeter wave band. Further, in a case in which the two-stage SA is performed, information regarding SA is contained in a part of the data resource.

In a right side diagram in FIG. 8, a time length of a sensing resource in the assistance band is set to half the time length of the sensing resource in the left side diagram. Similar to the left side diagram, in the right side diagram, one sensing resource in the assistance band corresponds to one data resource in the millimeter wave band.

Figure 9:
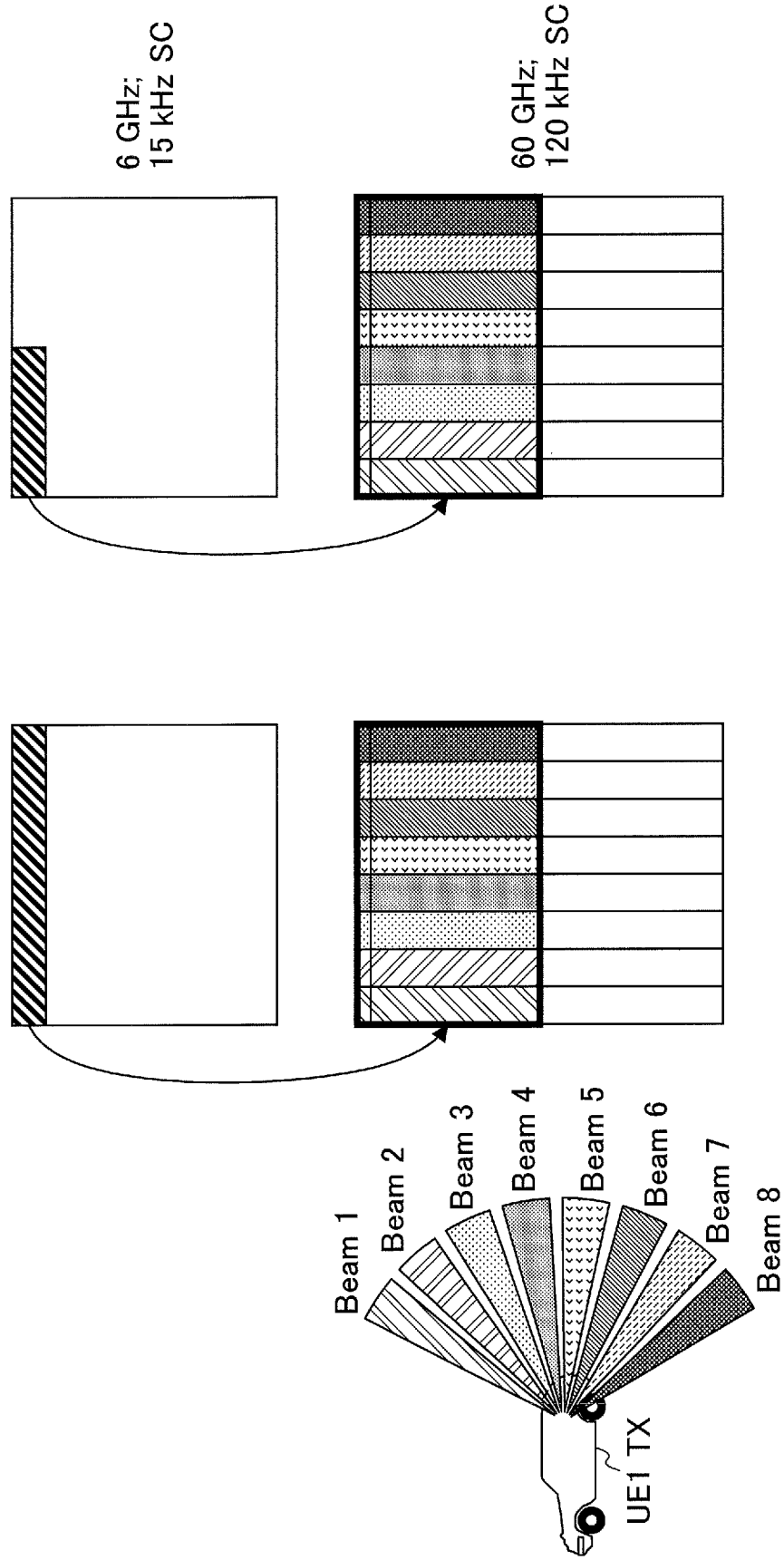
FIG. 9 is a diagram illustrating an example (2) of association between a sensing resource and a data resource in the embodiment.

FIG. 9 is a diagram illustrating an example (2) of association between a sensing resource and a data resource in the present embodiment. FIG. 9 illustrates a case in which one sensing resource is associated with a set of data resources. As illustrated in FIG. 9, suppose a case in which the assistance band used for sensing is a 6 GHz band, a subcarrier interval of the assistance band is 15 kHz, the millimeter wave band used for data communication is a 60 GHz band, and a subcarrier interval of the millimeter wave band is 120 kHz. The association between the sensing resource and the data resource as illustrated in FIG. 9 may be reported explicitly from the user device 100 to a user device 100 at close distance.

FIG. 9 illustrates a case in which one sensing resource corresponds to a set of data resources occupied by Beams 1 to 8 transmitted by UE1 using beam switching. In a right side diagram in FIG. 9, a time length of a sensing resource in the assistance band is set to half a time length of the sensing resource in the left side diagram. Note that repetitive beam transmission is performed instead of beam switching.

FIG. 10 is a diagram illustrating an example (3) of association between a sensing resource and a data resource in the present embodiment. FIG. 10 illustrates a case in which two sensing resources are each associated with one data resource. As illustrated in FIG. 10, suppose a case in which the assistance band used for sensing is a 6 GHz band, a subcarrier interval of the assistance band is 15 kHz, the millimeter wave band used for data communication is a 60 GHz band, and a subcarrier interval of the millimeter wave band is 120 kHz. An interval of resource association is longer than 1 TTI in the assistance band. The association between the sensing resource and the data resource as illustrated in FIG. 10 may be reported explicitly from the user device 100 to a user device 100 at close distance.

In performing transmission using a certain data resource, the user device 100 may perform transmission using all sensing resources associated with the certain data resources. A left side diagram in FIG. 10 illustrates a case in which two sensing resources each associated with a data resource are present and in which transmission is not performed on one of the sensing resources. In this case, as transmission is not performed on a sensing resource corresponding to a data resource, transmission on the data resource is not performed either. Conversely, as a right side diagram in FIG. 10 illustrates a case in which transmission is performed on two sensing resources each associated with a data resource, the data resources are usable in this case. Also, with respect to the right side diagram in FIG. 10, in a payload of the sensing resource, priority information or resource reservation information may be contained.

Figure 11:
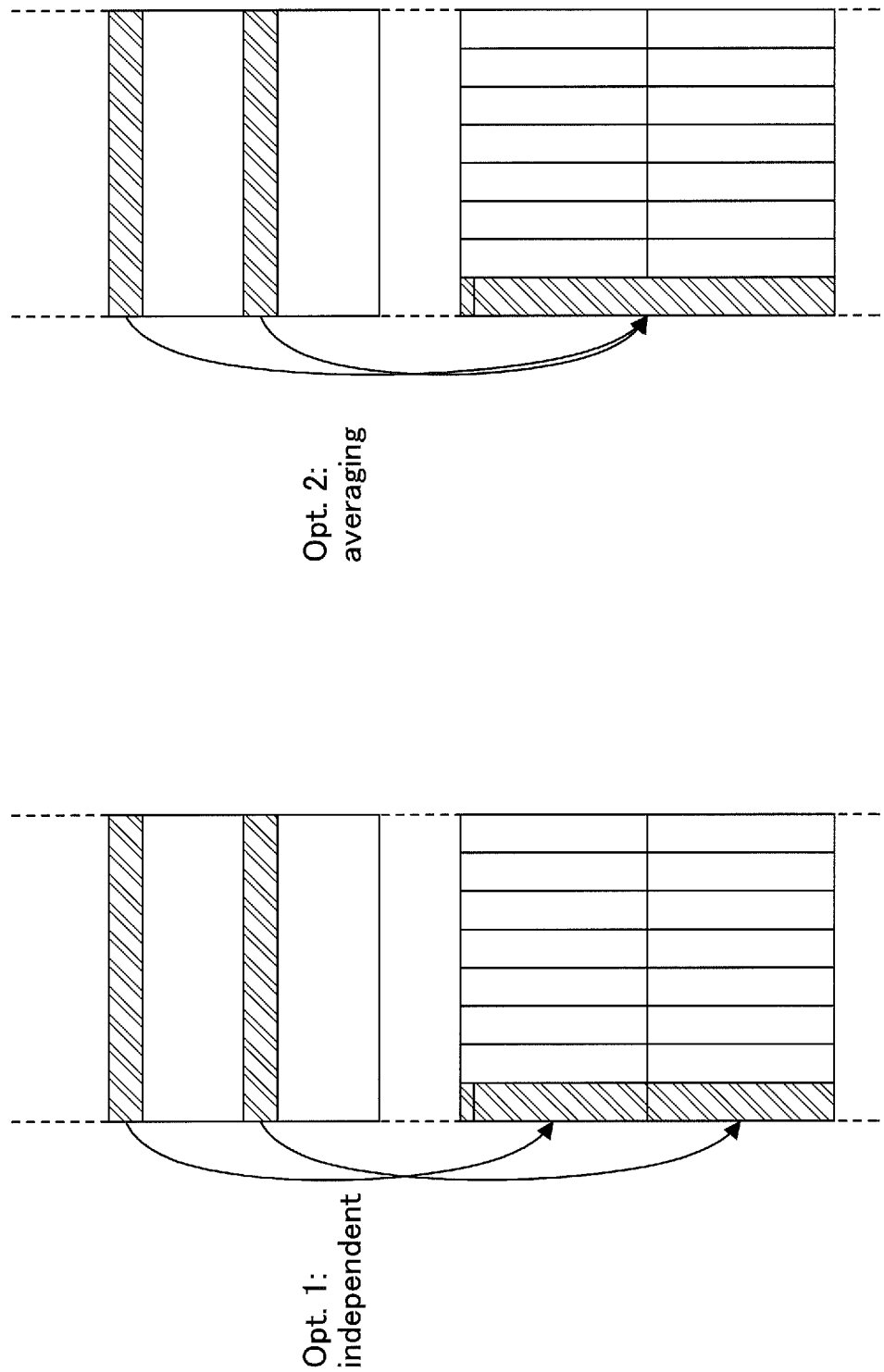
FIG. 11 is a diagram illustrating an example of data resource selection based on RSRP on a sensing resource according to the embodiment.

FIG. 11 is a diagram illustrating an example of data resource selection based on RSRP on a sensing resource according to the present embodiment. FIG. 11 illustrates a case in which measurement of RSRP is performed on two sensing resources.

In a diagram of "Opt. 1: independent", if RSRP of a certain sensing resource exceeds a threshold, a data resource corresponding to the sensing resource is excluded from candidate resources. That is, based on RSRP of each sensing resource, a determination whether or not a corresponding data resource is excluded is made.

In a diagram of "Opt. 2: averaging", if an average of respective RSRPs of two sensing resources exceeds a threshold, data resources corresponding to the sensing resources are excluded from candidate resources. That is, based on an average RSRP of multiple sensing resources, corresponding data resources (or a set of data resources) are excluded from candidate resources. The association of a set of sensing resources with a user device 100 is reported. A sensing signal transmitted from the user device 100 may contain information about a start point of the data resource or the set of the data resources.

Figure 12:
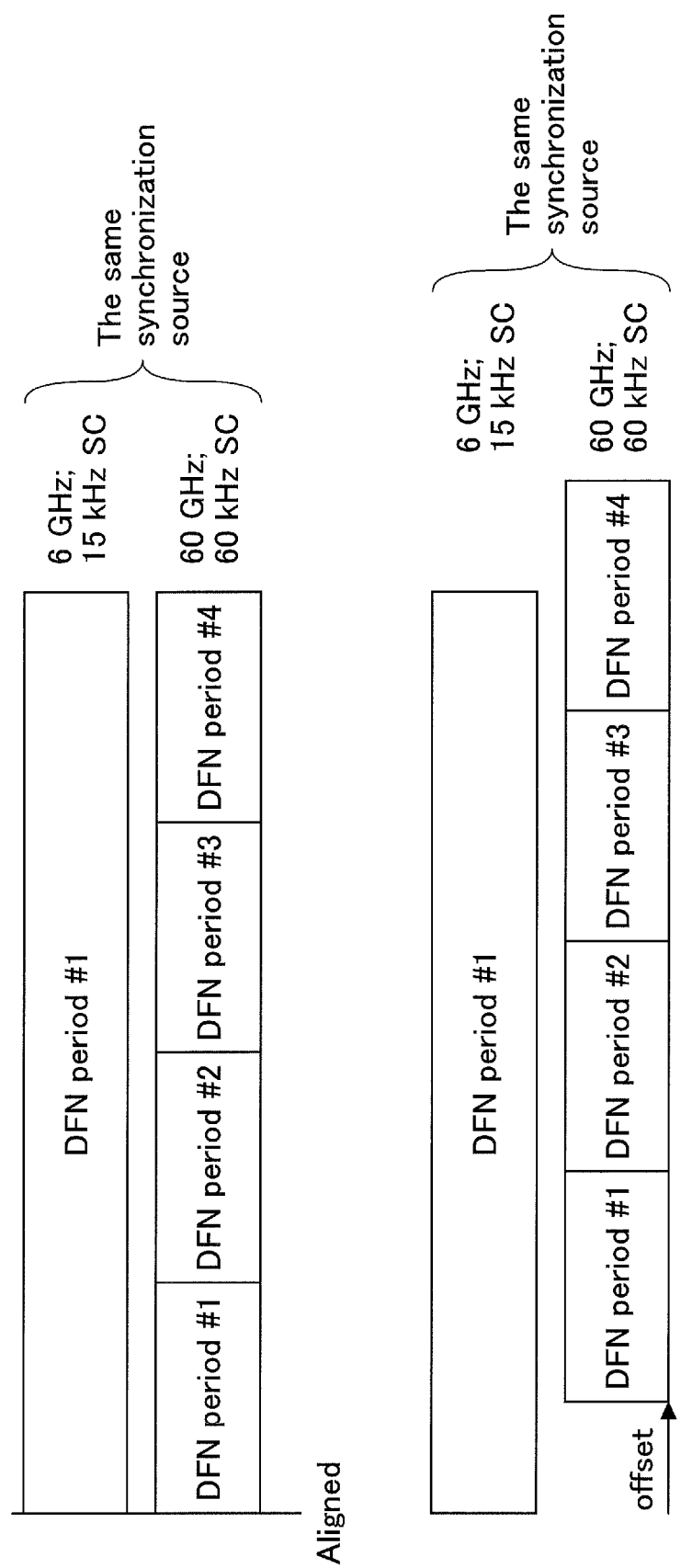
FIG. 12 is a diagram illustrating an example of cross carrier synchronization according to the embodiment.

FIG. 12 is a diagram illustrating an example of cross carrier synchronization according to the present embodiment. As illustrated in FIG. 12, suppose a case in which the assistance band used for sensing is a 6 GHz band, a subcarrier interval of the assistance band is 15 kHz, the millimeter wave band used for data communication is a 60 GHz band, and a subcarrier interval of the millimeter wave band is 60 kHz. A time length of DFN period #1 of the assistance band is equal to a time length from DFN period #1 to DFN period #4 in the millimeter wave band.

Synchronization of the assistance band used for sensing and the millimeter wave band used for data communication with the same source may be configured or defined in advance. DFN (D2D reference number) illustrated in FIG. 12 represents a system frame number in D2D communication. As illustrated in an upper diagram of FIG. 12, a DFN boundary in the assistance band may be configured (or may be predetermined) to be aligned with a DFN boundary in the millimeter wave band on a time axis of a radio frame. Alternatively, as illustrated in a lower diagram of FIG. 12, an offset between a DFN boundary in the assistance band and a DFN boundary in the millimeter wave band may be configured or predefined.

An index of a DFN period in the assistance band needs to be distinguished from indices of consecutive DFN periods in the millimeter waves having the shorter DFN period. A total time length of the consecutive DFN periods in the millimeter wave band is equal to the DFN period in the assistance band. An index of a DFN period should start from an aligned DFN boundary, and the index may be reported via SLSS or PSBCH (Physical Sidelink Broadcast Channel) for example.

In the above described embodiment, because a resource pool for sensing is provided in the assistance band of LF and a sensing signal is transmitted by omni-directional transmission, the sensing signal can be received in a wider area than a signal transmitted on the millimeter wave band. Thus, even a user device 100 that cannot receive a beam in the millimeter wave band is expected to be able to receive the sensing signal. Also, as possibility of occurrence of a resource collision is reduced, a problem that communication between the user devices 100 becomes a half-duplex mode can be mitigated.

That is, a user device performing signal transmission using the beamforming in D2D can appropriately select a resource to be used.

(Device Configuration)

Next, functional configurations of the user device 100 performing the operations described above will be explained. The user device 100 may embody every function disclosed in the above example. Alternatively, the user device 100 may embody only a part of functions disclosed in the above example.

Figure 13:
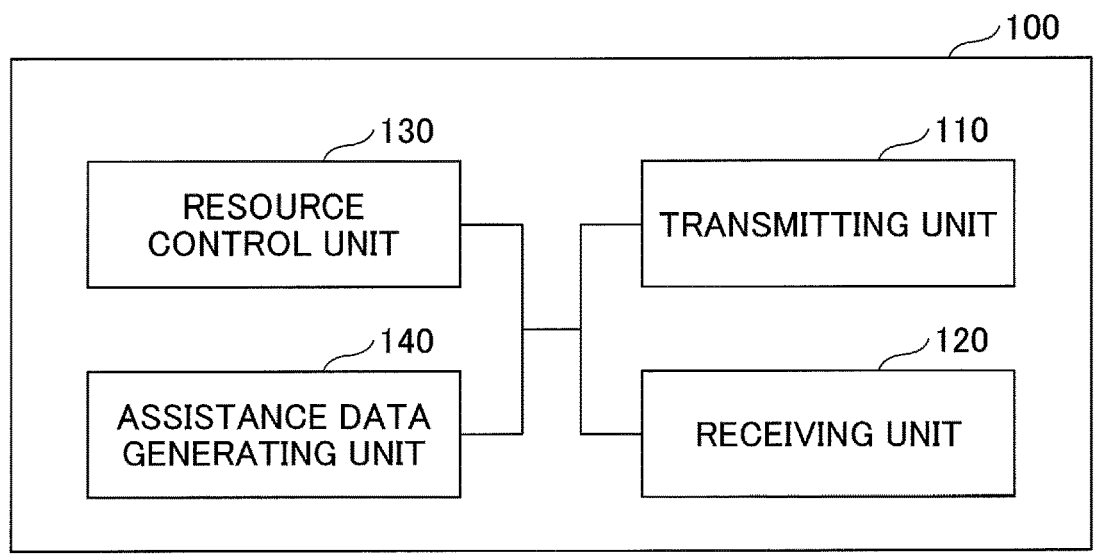
FIG. 13 is a diagram illustrating a functional configuration of the user device 100 according to the embodiment.

FIG. 13 is a diagram illustrating a functional configuration of the user device 100. As illustrated in FIG. 13, the user device 100 includes a transmitting unit 110, a receiving unit 120, a resource control unit 130, and an assistance data generating unit 140. The functional configuration illustrated in FIG. 13 is simply an example. Any types of division of function may be applicable and each of the functions may have an arbitrary name, as long as the operations according to the present embodiment can be practiced.

The transmitting unit 110 generates a transmission signal from data to be transmitted, and transmits the transmission signal wirelessly. The receiving unit 120 receives various types of signals wirelessly, and obtains signals of upper layers from the received signals of a physical layer. The receiving unit 120 also receives a synchronization signal, a control signal, data, and the like transmitted from the user device 100. Further, the transmitting unit 110 transmits data or a control signal to other user devices 100, and the receiving unit 120 receives data or a control signal from other user devices 100. Further, the transmitting unit 110 may perform transmission using beamforming.

The resource control unit 130 selects a resource to be used for transmission based on information detected by the receiving unit 120 performing sensing, as described in the above example. The resource control unit 130 also acquires explicit information for selecting resource that is contained in a sensing signal.

The assistance data generating unit 140 controls generation of a sensing signal performed in the user device 100, as described in the above example. Note that functional units regarding signal transmission for the resource control unit 130 or the assistance data generating unit 140 may be included in the transmitting unit 110, and that functional units regarding signal reception for the resource control unit 130 or the assistance data generating unit 140 may be included in the receiving unit 120.

(Hardware Configuration)

The diagram used for explaining the above embodiment (FIG. 13) illustrate blocks on a per functional block basis. These functional blocks (configuration units) are embodied by any combination of hardware and/or software. Further, an implementation method of these functional blocks is not limited to a specific one. That is, each functional block may be embodied by an apparatus in which multiple elements are physically and/or logically coupled to each other, or may be embodied by multiple physically and/or logically separated apparatuses that are connected (with a wire connection or a wireless connection, for example) directly and/or indirectly each other.

Figure 14:
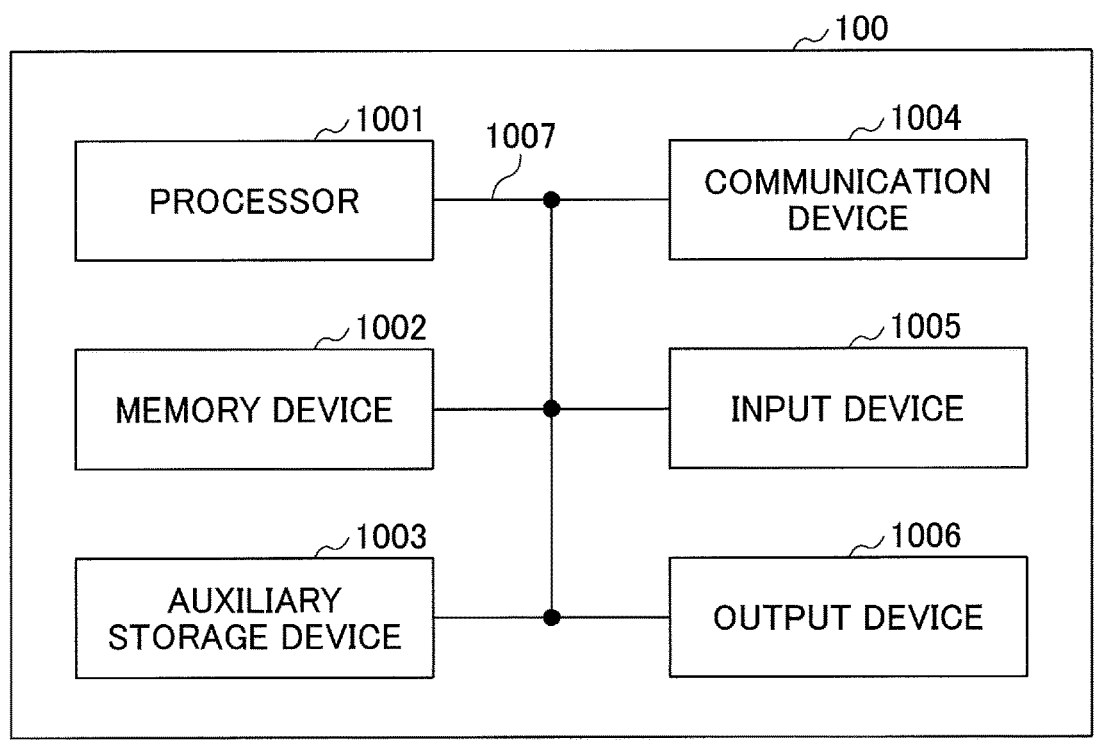
FIG. 14 is a diagram illustrating an example of a hardware configuration of the user device 100 according to the embodiment.

Further, for example, each of the user devices 100 according to an embodiment of the present invention may be a computer performing processes according to the present embodiment. FIG. 14 is a diagram illustrating an example of a hardware configuration of the user device 100 according to the present embodiment. Each of the user devices 100 mentioned above may be configured as a computing device including a processor 1001, a memory device 1002, an auxiliary storage device 1003, a communication device 1004, an input device 1005, an output device 1006, and a bus 1007.

Note that the term "device" may be deemed to be replaced with a circuit, an apparatus, or a unit. With respect to a hardware configuration of the user device 100, the number of each hardware component specified with the elements 1001 to 1006 in the drawing, which are included in the user device 100, may be one or more. Further, part of the hardware components may not be included in the user device 100.

Each function of the user device 100 is embodied by the processor 1001 performing arithmetic operations, and controlling communication via the communication device 1004 and data read and/or write on the memory device 1002 and the auxiliary storage device 1003, by loading a given program (software) on the hardware such as the processor 1001 or the memory device 1002.

The processor 1001 performs overall control of the computer, by executing an operating system, for example. The processor 1001 may be configured by a central processing unit (CPU) including an interface with peripheral devices, a controller device, an arithmetic unit, a register, and the like.

The processor 1001 further performs various processes in accordance with a program (program code), a software module, or data, loaded from the auxiliary storage device 1003 and/or the communication device 1004 onto the memory device 1002. The program used here is a program for causing a computer to perform at least part of the operations described in the above embodiment. For example, the transmitting unit 110, the receiving unit 120, the resource control unit 130, and the assistance data generating unit 140 in the user device 100 illustrated in FIG. 13 may be implemented by a control program stored in the memory device 1002 and executed by the processor 1001. In the above description, a case in which each of the above various processes is executed by a single processor 1001 has been explained, but the processes may be executed by two or more processors 1001 in parallel or sequentially. The processor 1001 may be implemented by more than one chip. Note that the program may be transmitted from a network via an electric telecommunication line.

The memory device 1002 is a computer-readable recording medium, and may be configured by at least one of a ROM (Read Only Memory), an EPROM (Erasable programmable ROM), an EEPROM (Electrically Erasable Programmable ROM), a RAM (Random Access Memory), and the like. The memory device 1002 may be referred to as a register, a cache, a main memory, or the like. The memory device 1002 can retain an executable program (program code) or software module necessary for performing the processes according to the embodiment of the present invention.

The auxiliary storage device 1003 is a computer-readable recording medium, and may be configured by at least one of an optical disk such as a CD-ROM (Compact Disc ROM), a hard disk drive, a flexible disk, a magneto-optical disk (such as a compact disc, a digital versatile disc, a Blu-ray disc (registered trademark)), a smartcard, a flash memory (such as a card, a stick, or a key drive), a floppy disk (registered trademark), and a magnetic stripe. The auxiliary storage device 1003 may be referred to as an auxiliary storage device. The above storage media may be a medium for a database, a server, or the like, including the memory device 1002 and/or the auxiliary storage device 1003.

The communication device 1004 is hardware (transmission and reception device) for performing communication between computers through a wired and/or wireless network, and is also referred to as, for example, a network device, a network controller, a network card, a communication module, or the like. For example, the transmitting unit 110 and the receiving unit 120 in the user device 100 may be implemented by the communication device 1004.

The input device 1005 is an input device (such as a keyboard, a mouse, a microphone, a switch, a button, or a sensor) for receiving an input from outside. The output device 1006 is an output device (such as a display, a speaker, or an LED lamp) for performing output to outside. Note that the input device 1005 and the output device 1006 may be integrated into a single device (for example, a touch panel).

Further, each of the hardware components such as the processor 1001 and the memory device 1002 is connected via the bus 1007 for communication. The bus 1007 may be a single bus, or the devices may be connected via different buses.

Further, the user device 100 may include hardware, such as a microprocessor, a digital signal processor (DSP), an ASIC (Application Specific Integrated Circuit), a PLD (Programmable Logic Device), or an FPGA (Field Programmable Gate Array). Part of or all of each functional block may be implemented by the above hardware. For example, the processor 1001 may be implemented by at least one of the hardware.

Summary of Embodiment

As described above, according to the present embodiment, there is provision of a user device performing communication with another user device by beamforming in a first frequency and a second frequency different from the first frequency. The user device includes a receiving unit configured to receive a first sensing signal in the first frequency; a control unit configured to select a resource in the second frequency used for transmission, based on a resource location on a radio frame in which the first sensing signal is provided, or based on information, contained in the first sensing signal, indicating a resource location on a radio frame in the second frequency; and a transmitting unit configured to perform data transmission on the second frequency by using the selected resource.

According to the above configuration, in a wireless communication system supporting D2D communication, a user device performing transmission using beamforming in D2D can appropriately select a resource to be used in the HF band, based on a resource location in the LF band or explicit notification of a resource location in the HF band.

The resource location on the radio frame in which the first sensing signal is provided may be associated with the resource location on the radio frame in the second frequency used for the transmission. According to the above configuration, a user device can appropriately select a resource to be used in the HF band based on a resource location in the LF band, and select a resource for transmitting a sensing signal in the LF band based on a resource location used in the HF band.

The control unit may be configured to select resources in the second frequency used for beam switching or repetitive beam transmission, based on the resource location on the radio frame in which the first sensing signal is provided, or based on the information, contained in the first sensing signal, indicating the resource location on the radio frame in the second frequency; and to exclude the selected resources from candidates of resources to be used for the transmission on the second frequency. According to the above configuration, a user device can exclude unusable resources in the HF band from candidates of resources, based on a resource location in the LF band or explicit notification of a resource location in the HF band.

The receiving unit may be configured not to perform sensing on the first frequency for selecting a resource in the second frequency, and the control unit may be configured to determine whether or not to perform sensing on the second frequency for selecting a resource in the second frequency. According to the above configuration, because a user device can perform sensing on an HF band without performing sensing on the LF band, the user device can appropriately select a resource in the HF band.

The control unit may be configured to select the resource in the second frequency used for transmission, based on received power of the first sensing signal on a single resource in the radio frame in which the first sensing signal is provided, or based on average received power of the first sensing signal on multiple resources in the radio frame in which the first sensing signal is provided. According to the above configuration, a user device can appropriately select a resource in the HF band based on RSRP or average RSRP of a sensing signal in the LF band.

The user device may further include a generating unit configured to generate a second sensing signal containing information indicating another resource location on the radio frame in the second frequency. The transmitting unit may be configured to transmit the generated second sensing signal by using a resource in the first frequency associated with said another resource location on the radio frame in the second frequency. According to the above configuration, a user device can cause a close-distance user device to select a resource in the HF band appropriately, by generating a sensing signal and transmitting the sensing signal on the LF band.

Supplement of Embodiment

Although the embodiment of the present invention has been described, a person skilled in the art will understand various variations, modifications, alternatives, replacements, and the like. Specific examples of numerical values have been used in the description in order to facilitate understanding of the invention. However, these numerical values are merely an example, and any other appropriate values may be used, unless otherwise stated. The separations of the items in the above description are not essential to the present invention. Depending on necessity, subject matter described in two or more items may be combined and used, and subject matter described in an item may be applied to subject matter described in another item (if they do not contradict). A boundary of a functional unit or a processing unit in the functional block diagrams may not necessarily correspond to a boundary of a physical component. Operations performed by multiple functional units may be executed in a single physical component, or an operation of a single functional unit may be executed by multiple physical components. With respect to procedures described in the embodiment, order can be rearranged, if no conflict occurs. Although the user device 100 has been described by using the functional block diagrams for the convenience of description, such a device may be embodied by hardware, software, or a combination of hardware and software. Each of the software executed by the processor included in the user device 100 in accordance with the embodiment of the present invention, and the software executed by the processor included in the user device 100 in accordance with the embodiment of the present invention may be stored in any appropriate storage medium, such as a random access memory (RAM), a flash memory, a read-only memory (ROM), an EPROM, an EEPROM, a register, a hard disk drive (HDD), a removable disk, a CD-ROM, a database, a server, or the like.

Further, notification of information is not necessarily made in accordance with an aspect or an embodiment described in the present specification, but may be performed using other methods. For example, notification of information may be performed using a physical layer signaling (such as DCI (Downlink Control Information) or UCI (Uplink Control Information)), an upper layer signaling (such as an RRC (Radio Resource Control) signaling, a MAC (Medium Access Control) signaling, or broadcast information (MIB (Master Information Block) or SIB (System Information Block))), other signaling, or a combination of these signaling. Also, an RRC signaling may be referred to as an RRC message, and may be a message such as an RRC Connection Setup message, or an RRC Connection Reconfiguration message.

An aspect or an embodiment described in the present specification may be applied to a system using an appropriate system such as LTE (Long Term Evolution), LTE-A (LTE-Advanced), SUPER 3G, IMT-Advanced, 4G, 5G, FRA (Future Radio Access), W-CDMA (registered trademark), GSM (registered trademark), CDMA2000, UMB (Ultra Mobile Broadband), IEEE 802.11 (Wi-Fi), IEEE 802.16 (WiMAX), IEEE 802.20, UWB (Ultra-WideBand), or Bluetooth (registered trademark), or applied to a next-generation system enhanced based on the above systems.

With respect to procedures, sequences, flowcharts, or the like, described in an aspect or an embodiment of the present specification, order can be changed if no conflict occurs. A method described in the present specification discloses various step elements in an exemplary order, and the order is not limited to the disclosed order.

The user device 100 may be referred to as, a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or other appropriate terms, by a person skilled in the art.

Terms "determine (determining)" used in the present specification may include a wide variety of operations. "Determining" may mean that, for example, judging, calculating, computing, processing, deriving, investigating, looking up (such as searching a table, a database or other data structure), or ascertaining is performed. "Determining" may also mean that receiving (such as receiving information), transmitting (such as transmitting information), inputting, outputting, or accessing (such as accessing data in a memory) is performed. Further, "Determining" may also mean that resolving, selecting, choosing, establishing, or comparing is performed. That is, that a certain action/operation is regarded as "determined" may be included in a scope of "determining".

A phrase "based on" that is used in the present specification does not mean "based on only", unless otherwise stated. In other words, the phrase "based on" means both "based on only" and "based on at least".

In a case in which a term "include", "including", or modifications of the term is used in the present specification or in the claims, these terms are intended to be comprehensive, similar to a term "comprising". Further, a term "or" used in the present specification or in the claims is not intended to be an exclusive or.

In an entirety of the present disclosure, if an article, such as "a", "an", or "the" in English, is added to a noun by translation, the article means that the noun may include one, or more than one noun, unless otherwise stated.

In the present embodiment, the LF band or the assistance band is an example of a first frequency. The sensing resource or the data resource is an example of a resource. The HF band or the millimeter wave band is an example of a second frequency. The resource control unit 130 is an example of a control unit. The assistance data generating unit 140 is an example of a generating unit.

Although the present invention has been described in detail in the above description, it is obvious for a person skilled in the art that the present invention is not limited to the embodiments described in the present specification. The present invention can be practiced as a modified embodiment or an altered embodiment without departing an aim and a scope of the present invention defined with the claims. Accordingly, the description of the present specification is for explaining examples, and does not intend to limit a scope of the present invention.

LIST OF REFERENCE SYMBOLS

100 user device
110 transmitting unit
120 receiving unit
130 resource control unit
140 assistance data generating unit
1001 processor
1002 memory device
1003 auxiliary storage device
1004 communication device
1005 input device
1006 output device

The invention claimed is:

1. A terminal that communicates with another terminal by beamforming in a first frequency and a second frequency different from the first frequency, the terminal comprising:
  a receiving unit configured to receive a first sensing signal in the first frequency;
  a control unit configured to select a resource in the second frequency used for transmission, based on a resource location on a radio frame in which the first sensing signal is provided, or based on information contained in the first sensing signal, the information indicating a resource location on a radio frame in the second frequency; and
  a transmitting unit configured to perform data transmission in the second frequency by using the selected resource.

2. The terminal according to claim 1, wherein the resource location on the radio frame in which the first sensing signal is provided is associated with the resource location on the radio frame in the second frequency used for the transmission.

3. The terminal according to claim 2, wherein the control unit is configured
  to select resources in the second frequency used for beam switching or repetitive beam transmission, based on a single resource location on the radio frame in which the first sensing signal is provided, or based on the information contained in the first sensing signal, the information indicating multiple resource locations on the radio frame in the second frequency; and to exclude the selected resources from candidates of resources to be used for transmission on the second frequency.

4. The terminal according to claim 1, wherein the control unit is configured to determine whether or not to perform sensing in the second frequency for selecting a resource in the second frequency, without performing sensing in the first frequency for selecting a resource in the second frequency.

5. The terminal according to claim 1, wherein the control unit is configured to select the resource in the second frequency used for transmission, based on received power of the first sensing signal on a single resource in the radio frame in which the first sensing signal is provided, or based on average received power of the first sensing signal on multiple resources in the radio frame in which the first sensing signal is provided.

6. The terminal according to claim 1, further comprising a generating unit configured to generate a second sensing signal containing information indicating another resource location on the radio frame in the second frequency; wherein
the transmitting unit is configured to transmit the generated second sensing signal by using a resource in the first frequency associated with said another resource location on the radio frame in the second frequency.

* * * * *